US009994332B2

(12) United States Patent
Ullyott et al.

(10) Patent No.: US 9,994,332 B2
(45) Date of Patent: Jun. 12, 2018

(54) ENGINE ASSEMBLY WITH DIRECT DRIVE OF GENERATOR

(71) Applicant: PRATT & WHITNEY CANADA CORP., Longueuil (CA)

(72) Inventors: Richard Ullyott, St-Bruno (CA); Anthony Jones, San Diego, CA (US); Andre Julien, Ste-Julie (CA); Jean Thomassin, Sainte-Julie (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 0 days. days.

(21) Appl. No.: 15/616,187

(22) Filed: Jun. 7, 2017

(65) Prior Publication Data

US 2017/0267370 A1 Sep. 21, 2017

Related U.S. Application Data

(63) Continuation of application No. 14/750,207, filed on Jun. 25, 2015, now Pat. No. 9,771,165.

(51) Int. Cl.
| | |
|---|---|
| *F01D 15/10* | (2006.01) |
| *F02C 6/00* | (2006.01) |
| *H02K 7/18* | (2006.01) |
| *H02P 9/04* | (2006.01) |
| *B64D 41/00* | (2006.01) |
| *F02C 3/10* | (2006.01) |
| *F01C 11/00* | (2006.01) |

(Continued)

(52) U.S. Cl.
CPC .............. *B64D 41/00* (2013.01); *F01C 1/22* (2013.01); *F01C 11/008* (2013.01); *F02C 3/10* (2013.01); *H02K 7/1815* (2013.01); *H02K 7/1823* (2013.01); *B64D 2013/0611* (2013.01); *Y02T 50/44* (2013.01); *Y02T 50/53* (2013.01)

(58) Field of Classification Search
USPC ................... 290/52; 123/568; 60/605, 641.2, 60/780–789
See application file for complete search history.

(56) References Cited

U.S. PATENT DOCUMENTS

| | | | |
|---|---|---|---|
| 3,103,780 | A | 9/1963 | Wilfred |
| 3,896,320 | A | 7/1975 | Moffatt |

(Continued)

FOREIGN PATENT DOCUMENTS

| | | |
|---|---|---|
| CA | 2821497 | 1/2014 |
| DE | 2634951 | 2/1978 |

(Continued)

*Primary Examiner* — Pedro J Cuevas
(74) *Attorney, Agent, or Firm* — Norton Rose Fulbright Canada

(57) ABSTRACT

An engine assembly for use as an aircraft auxiliary power unit, having internal combustion engine(s) in driving engagement with an engine shaft, a generator having a generator shaft directly engaged to the engine shaft such as to be rotatable at a same speed, a compressor having an outlet in communication with the internal combustion engine inlet, and a turbine having an inlet in communication with the internal combustion engine outlet. The turbine may be a first stage turbine, and the assembly may include a second stage turbine having an inlet in communication with the first stage turbine outlet. A method of providing electrical power to an aircraft is also discussed.

20 Claims, 11 Drawing Sheets

(51) Int. Cl.
*F01C 1/22* (2006.01)
*F03G 7/00* (2006.01)
*B64D 13/06* (2006.01)

(56) References Cited

U.S. PATENT DOCUMENTS

| | | | |
|---|---|---|---|
| 3,961,199 A | 6/1976 | Bronicki | |
| 4,145,888 A | 3/1979 | Roberts | |
| 4,294,074 A | 10/1981 | Striebich | |
| 4,367,626 A | 1/1983 | Schwartzman | |
| 4,404,805 A | 9/1983 | Curtil | |
| 4,449,370 A | 5/1984 | Ream | |
| 4,513,572 A * | 4/1985 | Bonnaud | F01K 23/065 60/618 |
| 4,535,592 A | 8/1985 | Zinsmeyer | |
| 4,562,803 A | 1/1986 | Tadokoro | |
| 4,691,521 A * | 9/1987 | Hirabayashi | F02B 37/18 60/602 |
| 4,766,729 A | 8/1988 | Miyajima | |
| 4,896,499 A | 1/1990 | Rice | |
| 5,142,867 A | 9/1992 | Bergmann et al. | |
| 5,329,770 A | 7/1994 | Ward | |
| 5,471,834 A | 12/1995 | Kapich | |
| 5,692,372 A | 12/1997 | Whurr | |
| 5,724,806 A * | 3/1998 | Horner | F02C 7/12 60/728 |
| 5,771,868 A * | 6/1998 | Khair | F02B 33/32 123/568.12 |
| 5,956,960 A | 9/1999 | Niggeman | |
| 5,967,461 A * | 10/1999 | Farrington | B64D 13/06 244/118.5 |
| 6,014,015 A | 1/2000 | Thorne et al. | |
| 6,062,026 A * | 5/2000 | Woollenweber | F02B 37/04 60/605.2 |
| 6,256,993 B1 | 7/2001 | Halimi | |
| 6,283,410 B1 | 9/2001 | Thompson | |
| 6,955,162 B2 * | 10/2005 | Larson | F02D 23/02 123/568.11 |
| 7,137,253 B2 | 11/2006 | Furman et al. | |
| 7,291,932 B2 | 11/2007 | Wurtele et al. | |
| 7,654,087 B2 | 2/2010 | Ullyott | |
| 7,775,044 B2 | 8/2010 | Julien et al. | |
| 7,950,231 B2 | 5/2011 | Vuk | |
| 8,141,360 B1 | 3/2012 | Huber | |
| 8,143,732 B2 | 3/2012 | Algrain | |
| 8,164,208 B2 | 4/2012 | Rosson et al. | |
| 8,480,460 B2 | 7/2013 | Schwarz | |
| 8,522,552 B2 * | 9/2013 | Waterstripe | F01D 1/22 415/202 |
| 8,584,459 B2 * | 11/2013 | Richards | F01D 15/10 290/52 |
| 9,200,556 B2 * | 12/2015 | Wong | F01N 5/04 |
| 9,267,442 B2 * | 2/2016 | Denholm | F02C 9/00 |
| 9,328,676 B2 * | 5/2016 | Paillard | F02B 37/12 |
| 9,518,507 B2 * | 12/2016 | Wong | F01N 5/04 |
| 9,540,992 B2 | 1/2017 | Thomassin et al. | |
| 9,797,297 B2 * | 10/2017 | Thomassin | F02B 29/0493 |
| 9,822,694 B2 * | 11/2017 | Mischler | F02B 37/013 |
| 9,869,240 B2 * | 1/2018 | Lamarre | F02B 41/10 |
| 9,879,591 B2 * | 1/2018 | Thomassin | F02B 29/0406 |
| 2004/0060278 A1 | 4/2004 | Dionne | |
| 2004/0088978 A1 | 5/2004 | Kurihara | |
| 2005/0081835 A1 * | 4/2005 | Larson | F02D 23/02 123/568.11 |
| 2007/0036193 A1 * | 2/2007 | Emanuel | H01S 3/0953 372/55 |
| 2008/0057848 A1 | 3/2008 | Gray et al. | |
| 2009/0007882 A1 | 1/2009 | Lents et al. | |
| 2009/0106978 A1 | 4/2009 | Wollenweber | |
| 2009/0255506 A1 | 10/2009 | Walker | |
| 2010/0018203 A1 * | 1/2010 | Richards | F01D 15/10 60/598 |
| 2010/0100300 A1 | 4/2010 | Brooks et al. | |
| 2010/0212316 A1 * | 8/2010 | Waterstripe | F01D 1/023 60/641.2 |
| 2010/0313573 A1 | 12/2010 | Walters et al. | |
| 2011/0036091 A1 * | 2/2011 | Waterstripe | F01D 1/22 60/643 |
| 2012/0117974 A1 | 5/2012 | Hilgeman et al. | |
| 2012/0285166 A1 | 11/2012 | Zahdeh | |
| 2013/0028768 A1 | 1/2013 | Fontaine et al. | |
| 2013/0028772 A1 | 1/2013 | Julien | |
| 2013/0036730 A1 | 2/2013 | Bruno et al. | |
| 2013/0164157 A1 * | 6/2013 | Roberts | F04D 17/00 417/406 |
| 2013/0187007 A1 | 7/2013 | Mackin | |
| 2013/0213048 A1 | 8/2013 | Stücki | |
| 2013/0227944 A1 * | 9/2013 | Denholm | F02C 9/00 60/605.1 |
| 2013/0327042 A1 * | 12/2013 | Waterstripe | F01K 25/08 60/641.2 |
| 2014/0020381 A1 | 1/2014 | Bolduc | |
| 2014/0230430 A1 | 8/2014 | Krug | |
| 2014/0230436 A1 * | 8/2014 | Wong | F01N 5/04 60/615 |
| 2014/0238040 A1 | 8/2014 | Duge | |
| 2014/0261249 A1 | 9/2014 | Turgeon et al. | |
| 2015/0275758 A1 | 10/2015 | Foutch et al. | |
| 2015/0285130 A1 | 10/2015 | Labedan et al. | |
| 2015/0322876 A1 * | 11/2015 | Paillard | F02B 37/12 60/600 |
| 2016/0053638 A1 * | 2/2016 | Stapp | F28F 9/001 60/650 |
| 2016/0084151 A1 * | 3/2016 | Wong | F01N 5/04 60/615 |
| 2016/0245152 A1 * | 8/2016 | Thomassin | F02B 33/40 |
| 2016/0245154 A1 * | 8/2016 | Thomassin | F02B 29/0493 |
| 2016/0245156 A1 * | 8/2016 | Lamarre | B64D 27/02 |
| 2016/0245161 A1 * | 8/2016 | Thomassin | F01C 1/22 |
| 2016/0245162 A1 * | 8/2016 | Lamarre | F01C 21/18 |
| 2016/0245163 A1 * | 8/2016 | Lamarre | F02B 41/10 |
| 2016/0245166 A1 * | 8/2016 | Thomassin | F02B 29/0418 |
| 2016/0245170 A1 * | 8/2016 | Lamarre | F01C 11/008 |
| 2016/0245171 A1 * | 8/2016 | Lamarre | F02B 37/004 |
| 2016/0245174 A1 * | 8/2016 | Lamarre | F02B 33/40 |
| 2016/0245185 A1 * | 8/2016 | Lamarre | F02C 3/04 |
| 2016/0369693 A1 | 12/2016 | Julien et al. | |
| 2016/0376021 A1 | 12/2016 | Ullyott et al. | |
| 2016/0376022 A1 | 12/2016 | Ullyott et al. | |
| 2016/0376023 A1 * | 12/2016 | Ullyott | F02C 3/10 290/52 |
| 2016/0376981 A1 | 12/2016 | Ullyott et al. | |
| 2017/0036775 A1 | 2/2017 | Jones et al. | |
| 2017/0037756 A1 | 2/2017 | Julien et al. | |
| 2017/0037774 A1 * | 2/2017 | Jones | F02B 53/04 |
| 2017/0037775 A1 | 2/2017 | Jones et al. | |
| 2017/0037776 A1 | 2/2017 | Jones et al. | |
| 2017/0226959 A1 * | 8/2017 | Julien | F02K 1/386 |
| 2017/0267370 A1 * | 9/2017 | Ullyott | F02C 3/10 |
| 2018/0030883 A1 * | 2/2018 | Thomassin | F02B 29/0418 |

FOREIGN PATENT DOCUMENTS

| | | |
|---|---|---|
| EP | 2452878 | 5/2012 |
| EP | 2631182 | 8/2013 |
| EP | 2687675 | 1/2014 |
| EP | 2687676 | 1/2014 |
| WO | 9848162 | 10/1998 |
| WO | 20100019527 | 2/2010 |
| WO | 20100039197 | 4/2010 |
| WO | 2014057227 | 4/2014 |

* cited by examiner

ENGINE ASSEMBLY WITH DIRECT DRIVE OF GENERATOR

CROSS-REFERENCE TO RELATED APPLICATIONS

This application is a continuation of U.S. application Ser. No. 14/750,207 filed Jun. 25, 2015, the entire contents of which are incorporated by reference herein

TECHNICAL FIELD

The application related generally to engine assemblies and, more particularly, to such engine assemblies used as auxiliary power units in aircraft.

BACKGROUND OF THE ART

Aircraft auxiliary power units (APU) commonly provide pressurized air and controlled speed shaft power to the aircraft systems as an alternative to extracting this energy from the main engine compressor flow and accessory gearboxes. The APU is often used to power systems when the main engines are shut down.

Known ground-based APUs typically include added weight and complexity which may not be compatible with use in aircraft applications.

SUMMARY

In one aspect, there is provided an engine assembly for use as an auxiliary power unit for an aircraft, the engine assembly comprising: at least one internal combustion engine in driving engagement with an engine shaft; a generator having a generator shaft in driving engagement with the engine shaft to provide electrical power for the aircraft, the generator and engine shafts being directly engaged to one another such as to be rotatable at a same speed; a compressor having an outlet in fluid communication with an inlet of the at least one internal combustion engine; and a turbine having an inlet in fluid communication with an outlet of the at least one internal combustion engine.

In another aspect, there is provided an engine assembly for use as an auxiliary power unit for an aircraft, the engine assembly comprising: at least one internal combustion engine in driving engagement with an engine shaft; a generator having a generator shaft in driving engagement with the engine shaft to provide electrical power for the aircraft, the generator and engine shafts being directly engaged to one another such as to be rotatable at a same speed; a compressor having an outlet in fluid communication with an inlet of the at least one internal combustion engine; a first stage turbine having an inlet in fluid communication with an outlet of the at least one internal combustion engine; and a second stage turbine having an inlet in fluid communication with an outlet of the first stage turbine; wherein at least one of the turbines is in driving engagement with the compressor.

In a further aspect, there is provided a method of providing electrical power to an aircraft, the method comprising: flowing compressed air from an outlet of a compressor to an inlet of at least one internal combustion engine of an engine assembly; rotating an engine shaft with the at least one internal combustion engine; driving a generator providing electrical power to the aircraft with the engine shaft through a direct drive engagement between a shaft of the generator and the engine shaft causing the shaft of the generator and the engine shaft to rotate at a same speed; and driving a turbine of the engine assembly with exhaust from the at least one internal combustion engine.

DESCRIPTION OF THE DRAWINGS

Reference is now made to the accompanying figures in which.

DETAILED DESCRIPTION

Figure 1:
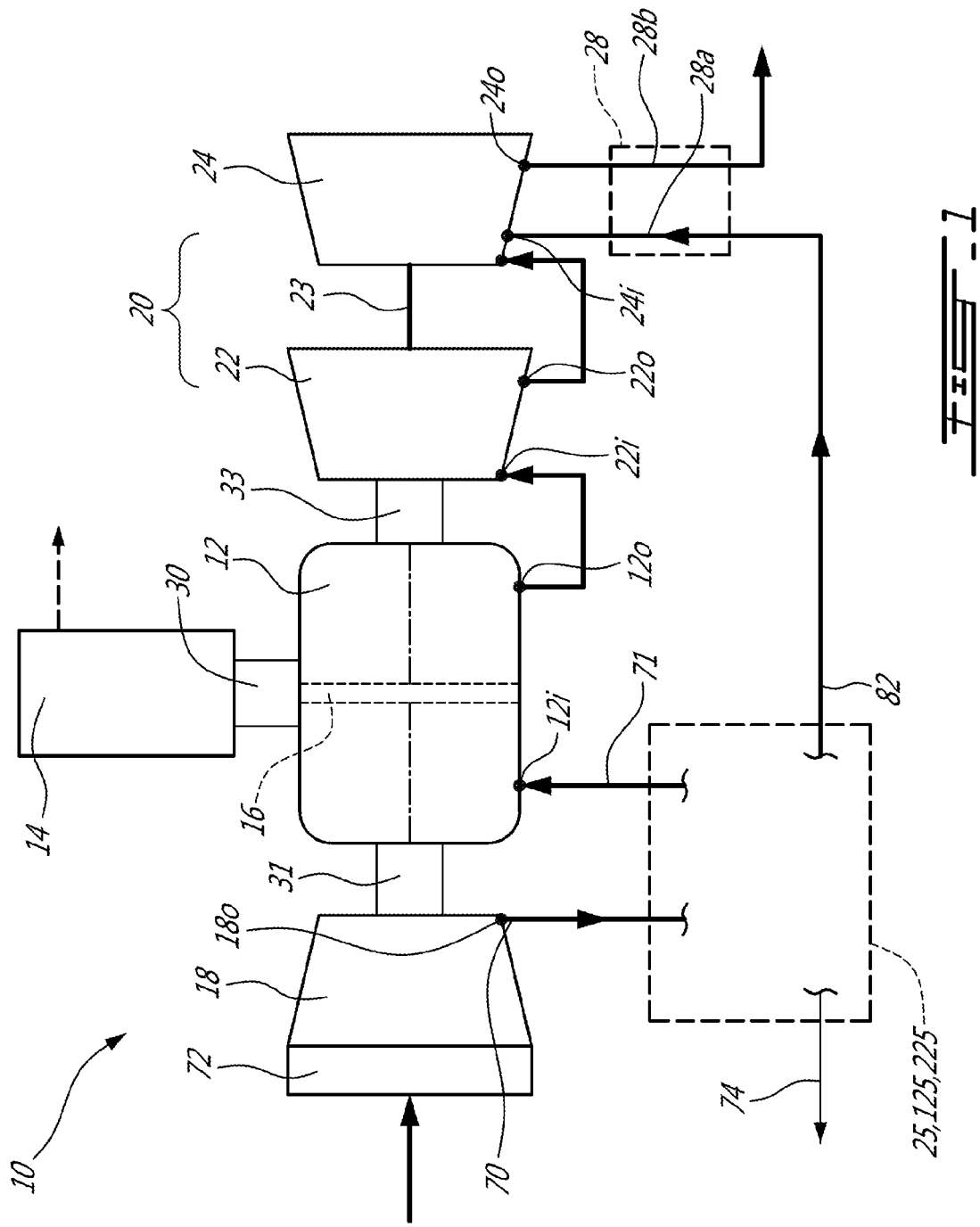
FIG. 1 is a schematic view of a compound engine assembly in accordance with a particular embodiment.

Referring to FIG. 1, a compound engine assembly 10 is schematically shown. The compound engine assembly 10 is particularly, although no exclusively, suitable for use as an airborne auxiliary power unit (APU). The compound engine assembly 10 includes an engine core 12 having an engine shaft 16 driving a load, shown here as a generator, for example to provide electrical power to an aircraft. Other possible loads may include, but are not limited to, a drive shaft, accessories, rotor mast(s), a compressor, or any other type of load or combination thereof. The compound engine assembly 10 further includes a compressor 18, a turbine section 20 compounding power with the engine core 12 and in driving engagement with the compressor 18 and generally including a first stage turbine 22 and a second stage turbine 24, and a flow distribution assembly 25, 125, 225, examples of which will be described further below.

Figure 2:
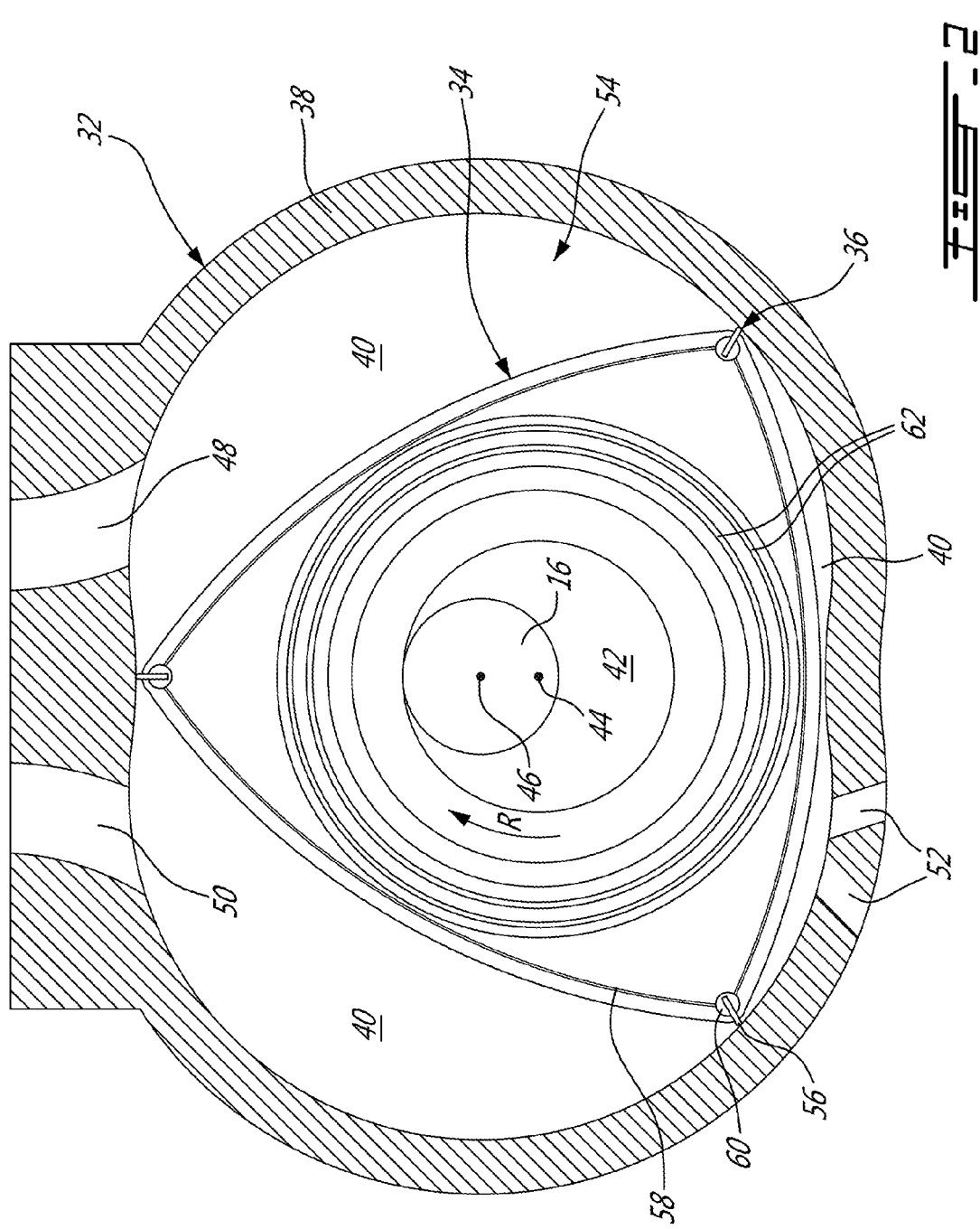
FIG. 2 is a cross-sectional view of a Wankel engine which can be used in a compound engine assembly such as shown in FIG. 1, in accordance with a particular embodiment.

In a particular embodiment, the engine core 12 includes one or more rotary engine(s) drivingly engaged to the common shaft 16 driving the load and each having a rotor sealingly engaged in a respective housing, with each rotary type engine having a near constant volume combustion phase for high cycle efficiency. The rotary engine(s) may be Wankel engine(s). Referring to FIG. 2, an exemplary embodiment of a Wankel engine is shown. Each Wankel engine comprises a housing 32 defining an internal cavity with a profile defining two lobes, which is preferably an epitrochoid. A rotor 34 is received within the internal cavity. The rotor defines three circumferentially-spaced apex portions 36, and a generally triangular profile with outwardly arched sides. The apex portions 36 are in sealing engagement with the inner surface of a peripheral wall 38 of the housing 32 to form three working chambers 40 between the rotor 34 and the housing 32.

The rotor 34 is engaged to an eccentric portion 42 of the shaft 16 to perform orbital revolutions within the internal cavity. The shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the internal cavity to undergo the four phases of intake, compression, expansion and exhaust.

An intake port 48 is provided through the peripheral wall 38 for successively admitting compressed air into each working chamber 40. An exhaust port 50 is also provided through the peripheral wall 38 for successively discharging the exhaust gases from each working chamber 40. Passages 52 for a glow plug, spark plug or other ignition element, as well as for one or more fuel injectors (not shown) are also provided through the peripheral wall 38. Alternately, the intake port 48, the exhaust port 50 and/or the passages 52 may be provided through an end or side wall 54 of the housing; and/or, the ignition element and a pilot fuel injector may communicate with a pilot subchamber (not shown) defined in the housing 32 and communicating with the internal cavity for providing a pilot injection. The pilot subchamber may be for example defined in an insert (not shown) received in the peripheral wall 38.

In a particular embodiment the fuel injectors are common rail fuel injectors, and communicate with a source of Heavy fuel (e.g. diesel, kerosene (jet fuel), equivalent biofuel), and deliver the heavy fuel into the engine(s) such that the combustion chamber is stratified with a rich fuel-air mixture near the ignition source and a leaner mixture elsewhere.

For efficient operation the working chambers 40 are sealed, for example by spring-loaded apex seals 56 extending from the rotor 34 to engage the peripheral wall 38, and spring-loaded face or gas seals 58 and end or corner seals 60 extending from the rotor 34 to engage the end walls 54. The rotor 34 also includes at least one spring-loaded oil seal ring 62 biased against the end wall 54 around the bearing for the rotor 34 on the shaft eccentric portion 42.

Each Wankel engine provides an exhaust flow in the form of a relatively long exhaust pulse; for example, in a particular embodiment, each Wankel engine has one explosion per 360° of rotation of the shaft, with the exhaust port remaining open for about 270° of that rotation, thus providing for a pulse duty cycle of about 75%. By contrast, a piston of a reciprocating 4-stroke piston engine typically has one explosion per 720° of rotation of the shaft with the exhaust port remaining open for about 180° of that rotation, thus providing a pulse duty cycle of 25%.

In a particular embodiment which may be particularly but not exclusively suitable for low altitude, each Wankel engine has a volumetric expansion ratio of from 5 to 9, and a volumetric compression ratio lower than the volumetric expansion ratio. The power recovery of the first stage turbine may be maximized by having the exhaust gas temperatures at the material limit, and as such is suitable for such relatively low volumetric compression ratios, which may help increase the power density of the Wankel engine and may also improve combustion at high speed and of heavy fuel.

It is understood that other configurations are possible for the engine core 12. The configuration of the engine(s) of the engine core 12, e.g. placement of ports, number and placement of seals, etc., may vary from that of the embodiment shown. In addition, it is understood that each engine of the engine core 12 may be any other type of internal combustion engine including, but not limited to, any other type of rotary engine, and any other type of non-rotary internal combustion engine such as a reciprocating engine.

Referring back to FIG. 1, the compressor 18 is a supercharger compressor which may be a single-stage device or a multiple-stage device and may be a centrifugal or axial device with one or more rotors having radial, axial or mixed flow blades. Air enters the compressor and is compressed and delivered to an outlet conduit 70 communicating with the outlet 18o of the compressor 18, and then circulated in part to an inlet conduit 71 communicating with the outlet conduit 70 through the flow distribution assembly 25, 125, 225. The inlet conduit 71 delivers the compressed air to the inlet 12i of the engine core 12, which corresponds to or communicates with the inlet of each engine of the engine core 12. In a particular embodiment, the flow and pressure ratio of the compressor 18 is regulated using variable inlet guide vanes (VIGV) and/or a variable diffuser at the inlet of the compressor 18 and both generally indicated at 72, to achieve flow and power modulation. In a particular embodiment, the compressor 18 has a compression pressure ratio of approximately 4:1. Other values are also possible.

In the embodiment shown, the compressor outlet 18o is also in fluid communication with a bleed conduit 74 through the flow distribution assembly 25, 125, 225, which provides a fluid communication between the outlet conduit 70 and the bleed conduit 74. The bleed conduit 74 has an end configured for connection to a pneumatic system of the aircraft such that part of the compressed air from the compressor 18 may also be supplied to the aircraft to support the aircraft pneumatic system. Accordingly, the compressor 18 provides both bleed air to the aircraft and compressed air to the engine core 12.

The engine core 12 receives the pressurized air from the compressor 18 and burns fuel at high pressure to provide energy. Mechanical power produced by the engine core 12 drives the electrical generator 14 which provides power for the aircraft; in the embodiment shown the connection between the shaft 16 of the engine core 12 and the generator 14 is done through an appropriate type of gearbox 30. In another embodiment, the electrical generator 14 has a design speed compatible with the rotational speed of the engine core 12, for example from about 6000 to about 10000 rpm (rotations per minute) with an engine core 12 including rotary engine(s), and the shaft 16 of the engine core 12 drives the electrical generator 14 directly (see FIG. 9)—i.e. through any type of engagement between the engine shaft 16 with the shaft of the generator rotor resulting in both shafts rotating at a same speed. In a particular embodiment, direct driving of the electrical generator 14 may provide for a reduction in gear losses which can be around 1% of the applied load; in a particular embodiment, the applied load of the generator 14 is about 200 hp and accordingly a loss reduction of approximately 2 hp in the waste heat produced by the engine assembly 10 may be obtained.

In a particular embodiment, the engine core 12 includes rotary engine(s), for example Wankel engine(s), and the generator 14 directly driven by the engine core has a nominal frequency of 400 Hz (e.g. actual frequency range of approximately 380-420 Hz) and is a 6 pole, 3 phases, alternative current generator having a design speed of from 7600 to 8400 rpm. In another particular embodiment, the generator 14 directly driven by the rotary (e.g. Wankel) engine core has a nominal frequency of 400 Hz and is a 8 pole, 3 phases, alternative current generator having a design speed of from 5700 to 6300 rpm. In another particular embodiment, the generator 14 directly driven by the rotary (e.g. Wankel) engine core has a nominal frequency of 400 Hz and is a 4 pole, 3 phases, alternative current generator having a design speed of from 11400 to 12600 rpm.

Is it understood that other types of generators 14 may be used. For example, the engine assembly 10 used as an APU can be configured to provide other high frequency alternative current supplies by selecting the operating speed and generator pole count to provide minimum weight, volume and/or heat as required. Variable speed operation may be employed when the associated electrical load is not frequency sensitive. Other variations are also possible.

The shaft 16 of the engine core 12 is also mechanically coupled to the rotor(s) of the compressor 18 such as to provide mechanical power thereto, through another gearbox 31. In a particular embodiment, the gearbox 31 providing the mechanical coupling between the rotor(s) of the compressor 18 and the engine core 12 defines a speed ratio of about 10:1 between the compressor rotor(s) and engine core.

In a particular embodiment where the engine core 12 includes internal combustion engine(s), each engine of the engine core 12 provides an exhaust flow in the form of exhaust pulses of high pressure hot gas exiting at high peak velocity. The outlet 12o of the engine core 12 (i.e. the outlet of each engine of the engine core 12) is in fluid communication with the inlet 22i of the first stage turbine 22, and accordingly the exhaust flow from the engine core 12 is supplied to the first stage turbine 22. Mechanical energy recovered by the first stage turbine 22 is coupled to the shaft 16 of the engine core 12 via a gearbox 33; the rotor(s) of the compressor 18 are thus drivingly engaged to the rotor(s) of the first stage turbine 22 through the engine core 12. In a particular embodiment, the first stage turbine 22 is configured as a velocity turbine, also known as an impulse turbine, and recovers the kinetic energy of the core exhaust gas while creating minimal or no back pressure. The first stage turbine 22 may be a centrifugal or axial device with one or more rotors having radial, axial or mixed flow blades.

The inlet 24i of the second stage turbine 24 is in fluid communication with the outlet 22o of the first stage turbine 22 and completes the recovery of available mechanical energy from the exhaust gas. The second turbine 24 is also coupled to the shaft 16 of the engine core 12 through the gearbox 33; the rotor(s) of the compressor 18 are thus drivingly engaged to the rotor(s) of the second stage turbine 24 through the engine core 12. In a particular embodiment, the second stage turbine 24 is configured as a pressure turbine, also known as a reaction turbine. The second stage turbine 24 may be a centrifugal or axial device with one or more rotors having radial, axial or mixed flow blades.

In the embodiment shown, the rotors of the first and second stage turbines 22, 24 are connected to a same shaft 23 which is coupled to the engine core 12 through the gearbox 33. Alternately, the turbines 22, 24 could be mounted on different shafts, for example with the first stage turbine 22 mounted on a first shaft coupled to the engine shaft 16 (for example through the gearbox 23) and the second stage turbine 24 mounted on a second shaft drivingly engaged to the compressor 18.

A pure impulse turbine works by changing the direction of the flow without accelerating the flow inside the rotor; the fluid is deflected without a significant pressure drop across the rotor blades. The blades of the pure impulse turbine are designed such that in a transverse plane perpendicular to the direction of flow, the area defined between the blades is the same at the leading edges of the blades and at the trailing edges of the blade: the flow area of the turbine is constant, and the blades are usually symmetrical about the plane of the rotating disc. The work of the pure impulse turbine is due only to the change of direction in the flow through the turbine blades. Typical pure impulse turbines include steam and hydraulic turbines.

In contrast, a reaction turbine accelerates the flow inside the rotor but needs a static pressure drop across the rotor to enable this flow acceleration. The blades of the reaction turbine are designed such that in a transverse plane perpendicular to the direction of flow, the area defined between the blades is larger at the leading edges of the blades than at the trailing edges of the blade: the flow area of the turbine reduces along the direction of flow, and the blades are usually not symmetrical about the plane of the rotating disc. The work of the pure reaction turbine is due mostly to the acceleration of the flow through the turbine blades.

Most aeronautical turbines are not "pure impulse" or "pure reaction", but rather operate following a mix of these two opposite but complementary principles—i.e. there is a pressure drop across the blades, there is some reduction of flow area of the turbine blades along the direction of flow, and the speed of rotation of the turbine is due to both the acceleration and the change of direction of the flow. The degree of reaction of a turbine can be determined using the temperature-based reaction ratio (equation 1) or the pressure-based reaction ratio (equation 2), which are typically close to one another in value for a same turbine:

$$\text{Reaction}(T) = \frac{(t_{S3} - t_{S5})}{(t_{S0} - t_{S5})} \quad (1)$$

$$\text{Reaction}(P) = \frac{(P_{S3} - P_{S5})}{(P_{S0} - P_{S5})} \quad (2)$$

where T is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

In a particular embodiment, the first stage turbine 22 is configured to take benefit of the kinetic energy of the pulsating flow exiting the engine core 12 while stabilizing the flow, and the second stage turbine 24 is configured to extract energy from the remaining pressure in the flow while expanding the flow. Accordingly, the first stage turbine 22 has a smaller reaction ratio than that of the second stage turbine 24.

In a particular embodiment, the second stage turbine 24 has a reaction ratio higher than 0.25; in another particular embodiment, the second stage turbine 24 has a reaction ratio higher than 0.3; in another particular embodiment, the second stage turbine 24 has a reaction ratio of about 0.5; in another particular embodiment, the second stage turbine 24 has a reaction ratio higher than 0.5.

In a particular embodiment, the first stage turbine 22 has a reaction ratio of at most 0.2; in another particular embodiment, the first stage turbine 22 has a reaction ratio of at most 0.15; in another particular embodiment, the first stage turbine 22 has a reaction ratio of at most 0.1; in another particular embodiment, the first stage turbine 22 has a reaction ratio of at most 0.05.

It is understood that any of the above-mentioned reaction ratios for the second stage turbine 24 can be combined with any of the above-mentioned reaction ratios for the first stage turbine 22, and that these values can correspond to pressure-based or temperature-based ratios. Other values are also possible. For example, in a particular embodiment, the two turbines 22, 24 may have a same or similar reaction ratio; in another embodiment, the first stage turbine 22 has a higher reaction ratio than that of the second stage turbine 24. Both turbines 22, 24 may be configured as impulse turbines, or both turbines 22, 24 may be configured as pressure turbines.

Is it understood that the connections between the rotors of the compressor 18 and turbines 22, 24 may be different than the embodiment shown. For example, the rotors of the compressor 18 and turbines 22, 24 may be coupled to the engine core 12 by a gearing system or variable speed drive such that power can be shared mechanically. Alternately, the compressor may be a turbocharger directly driven by the second stage turbine 24 without power transfer between the compressor 18 and the engine core 12, for example by having the rotors of the compressor 18 and second stage turbine 24 mounted on common shaft rotating independently of the shaft 16 of the engine core 12. In this case a variable area turbine vane may be provided at the inlet of the second stage (turbocharger) turbine 24 to provide adequate control of the compressor drive.

In use, there are typically operational situations where the aircraft cannot accept compressed air from the APU but still requires the APU to run, for example to power the generator 14. In this case the compressor 18 produces excess flow and needs to be protected from surge. In the embodiment shown, the compressor outlet 18o is also in fluid communication with an excess air duct 82 receiving this excess or surge flow, through the flow distribution assembly 25, 125, 225 which provides a fluid communication between the outlet conduit 70 and the excess air duct 82. The excess air duct 82 provides an alternate path for the excess air produced by the compressor 18.

In a particular embodiment which is not shown, the excess air is dumped to atmosphere, for example by having the excess air duct 82 in fluid communication with the exhaust of the engine assembly 10. In the embodiment shown, the excess air duct 82 has a first end communicating with the compressor outlet 18o and an opposed end communicating with the second stage turbine inlet 24i, such as to recover energy from the main flow and the surge excess flow. The excess air duct 82 thus defines a flow path between the compressor outlet 18o and the turbine section which is separate from the engine core 12. The excess air duct 82 may communicate with the second stage turbine inlet 24i together with the exhaust from the first stage turbine outlet 22o through an inlet mixing device, or through a partial segregated admission turbine configuration (segregated admission nozzle) where some vane passages in the turbine entry nozzle are dedicated to the flow from the excess air duct 82 while other vane passages are dedicated to the exhaust flow from the first stage turbine outlet 22o. The second stage turbine 24 may feature a variable nozzle to facilitate control of load sharing and different levels of returned excess air.

The excess air duct 82 may alternately communicate with the inlet 22i of the first stage turbine 22, or with the inlet of a third turbine (not shown) dedicated to recovering excess air energy. Such a third turbine may be connected to the shaft 16 of the engine core 12, for example through an over-running clutch, to return the energy extracted from the excess flow to the shaft 16, or may be used to drive other elements, including, but not limited to, a cooling fan and/or an additional generator. Other types of connections and configurations are also possible.

In a particular embodiment, an exhaust heat exchanger 28 is provided to provide heat exchange relationship between the air circulating through the excess air duct 82 and the exhaust air from the outlet 24o of the second stage turbine 24. The heat exchanger 28 thus includes at least one first conduit 28a in heat exchange relationship with at least one second conduit 28b. The excess air duct 82 is in fluid communication with the second stage turbine inlet 24i through the first conduit(s) 28a of the heat exchanger 28, and the second conduit(s) 28b of the heat exchanger 28 is/are in fluid communication with the second stage turbine outlet 24o such that the exhaust from the second stage turbine 24 circulates therethrough. In a particular embodiment, the exhaust heat exchanger 28 recovers energy from the waste heat in the exhaust and increases the temperature of the excess flow (surge bleed flow) coming into the second stage turbine 24, which improves its capacity to do work in the turbine. This provides a hybrid partially recuperated cycle.

In an alternate embodiment, the exhaust heat exchanger 28 is omitted.

Exemplary embodiments for the flow diverting assembly 25, 125, 225 will now be described. It is understood however than the compressor outlet 18o/outlet conduit 70 can be in fluid communication with the engine core inlet 12i/inlet conduit 71, the bleed conduit 74 and/or the excess air duct 82 through any other appropriate type or configuration of fluid communication. For example, the bleed conduit 74 could be connected to the compressor outlet 18o separately from the outlet conduit 70.

Figure 3:
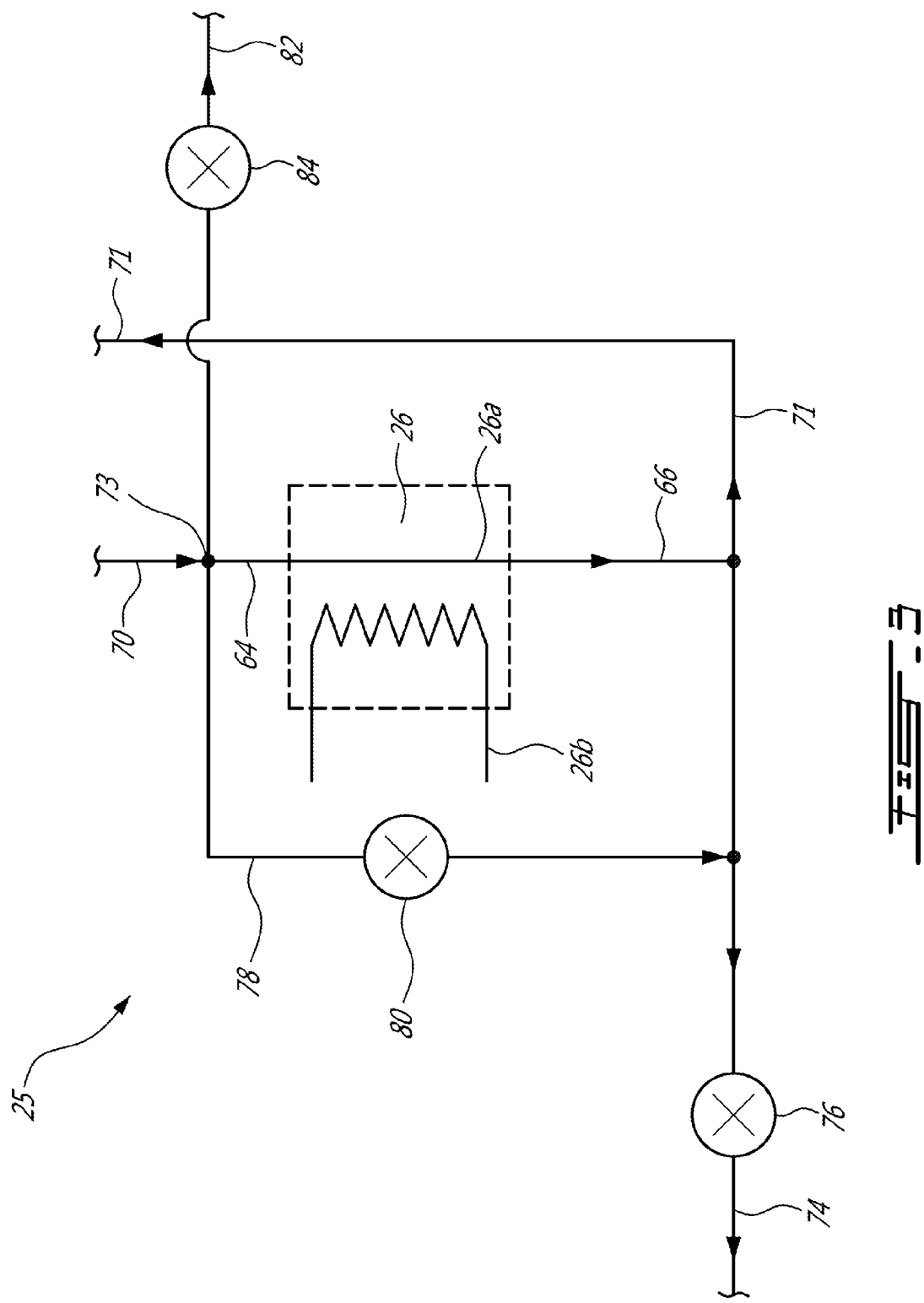
FIGS. 3-5 are schematic views of flow distribution assemblies which can be used in a compound engine assembly such as shown in FIG. 1, in accordance with particular embodiments.

Referring to FIG. 3, in a particular embodiment, the flow diverting assembly 25 includes an intercooler 26, and the outlet conduit 70 is connected to a branch 73 splitting the flow between a bypass conduit 78, an intercooler inlet conduit 64 and the excess air duct 82. The communication between the branch 73 and the excess air duct 82 is performed through a diverter valve 84 to effect throttling of the excess air flow or shut it off when required. The excess air duct 82 thus communicates with the outlet conduit 70 upstream of the intercooler 26; in a particular embodiment, such a configuration allows for leaving maximum energy in the compressed air being diverted into the excess air duct 82.

The intercooler 26 includes at least one first conduit 26a in heat exchange relationship with at least one second conduit 26b. Each first conduit 26a of the intercooler 26 has an inlet in fluid communication with the intercooler inlet conduit 64, and an outlet in fluid communication with an intercooler outlet conduit 66. Each second conduit 26b of the intercooler 26 is configured for circulation of a coolant therethrough, for example cooling air. The compressed air circulating through the first conduit(s) 26a is thus cooled by the coolant circulating through the second conduit(s) 26b.

The intercooler outlet conduit 66 is in fluid communication with the inlet conduit 71 (and accordingly with the engine core inlet 12i) and with the bleed conduit 74; the communication with the bleed conduit 74 is performed through a bleed air valve 76, which in a particular embodiment is a load control valve, to effect throttling of the bleed or shut it off when required. The intercooler 26 accordingly reduces the temperature of the compressed air going to the engine core 12 as well as the compressed air being channelled to the aircraft through the bleed air valve 76 and bleed conduit 74. In a particular embodiment, the pre-cooling of the air going to the aircraft allows for a higher delivery pressure than APU systems which are not pre-cooled and accordingly temperature limited for safety reasons. A higher pressure delivery may generally permit smaller ducts and pneumatic equipment, which may allow for weight savings on the aircraft.

The bypass conduit 78 provides fluid communication between the outlet conduit 70 and each of the inlet conduit 71 and bleed air valve 76 in parallel of the intercooler 26, thus allowing for a selected part of the flow to bypass the intercooler 26 before reaching the bleed air valve 76 (and accordingly the bleed conduit 74) and the inlet conduit 71 (and accordingly the engine core inlet 12*i*). The bypass conduit 78 includes a bypass valve 80 regulating the flow bypassing the intercooler 26. Accordingly, the temperature of the compressed air circulated to the inlet and bleed conduits 71, 74 may be regulated by changing the proportion of the flow going through the intercooler 26 by controlling the proportion of the flow going through the bypass conduit 78 with the bypass valve 80. In this particular embodiment, the compressed flow circulated to the inlet conduit 71 has the same temperature as the compressed flow circulated to the bleed conduit 74. In a particular embodiment the compressed air is cooled by the intercooler 26 such that the air circulated to the bleed conduit 74 and the inlet conduit 71 has a temperature of 250° F. or lower; other values are also possible.

Figure 4:
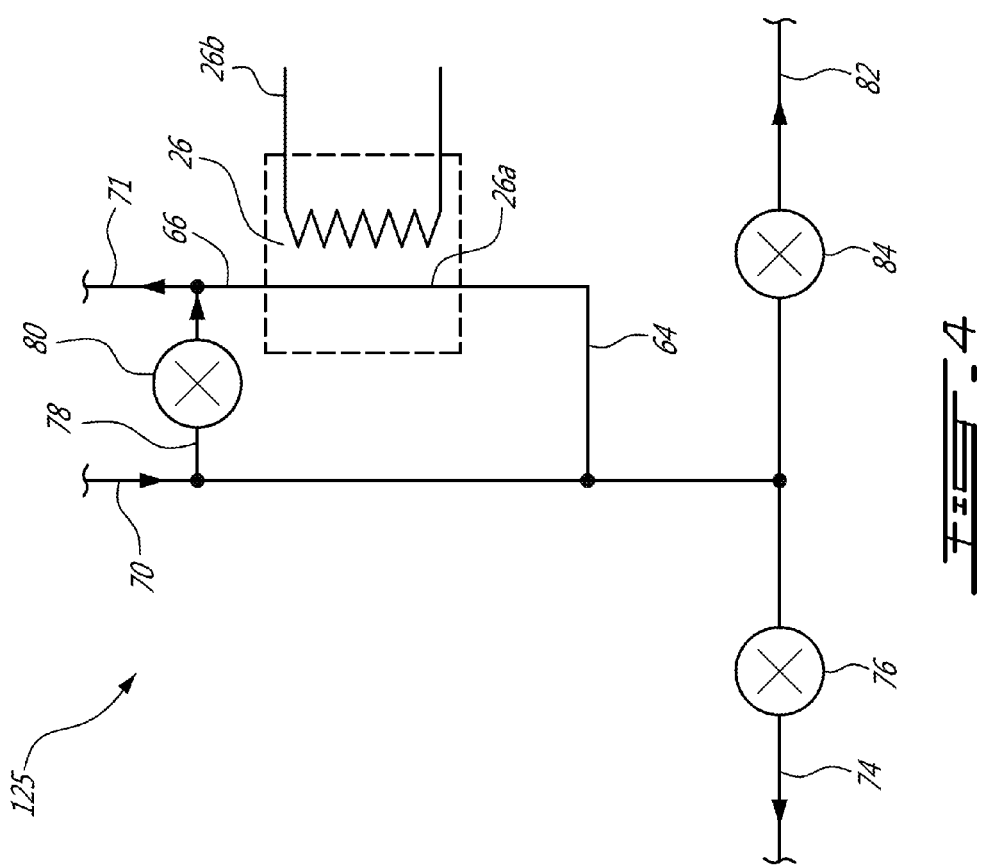

Referring to FIG. 4, another particular embodiment of the flow diverting assembly 125 is shown. The outlet conduit 70 is connected to the bypass conduit 78, the intercooler inlet conduit 64, the excess air duct 82 (through the diverter valve 84) and the bleed conduit 74 (through the bleed air valve 76). In this embodiment, since the bleed conduit 74 communicates with the outlet conduit 70 upstream of the intercooler 26, the compressed air is not cooled before being circulated to the bleed conduit 74.

The intercooler outlet conduit 66 is in fluid communication with the inlet conduit 71 (and accordingly with the engine core inlet 12*i*); the intercooler 26 thus reduces the temperature of the compressed air going to the engine core 12. The bypass conduit 78 provides fluid communication between the outlet conduit 70 and the inlet conduit 71 in parallel of the intercooler 26, thus allowing for a selected part of the flow to bypass the intercooler 26 before reaching the inlet conduit 71 (and accordingly the engine core inlet 12*i*). The temperature of the compressed air circulated to the inlet conduit 71 may be regulated by changing the proportion of the flow going through the intercooler 26 by controlling the proportion of the flow going through the bypass conduit 78 with the bypass valve 80 included therein. In a particular embodiment the compressed air circulating in the outlet conduit 70 and to the bleed conduit 74 has a temperature of 450° F. or lower, and the intercooler 26 cools part of the compressed air so that the air circulated to the inlet conduit 71 has a temperature of 250° F. or lower; other values are also possible. In a particular embodiment, using the intercooler 26 to cool only the portion of the compressed air circulated to the inlet conduit 71 may allow for the intercooler 26 to be significantly smaller than an intercooler also used to cool the portion of the air circulated to the bleed conduit 74, for example such as shown in FIG. 3.

Figure 5:
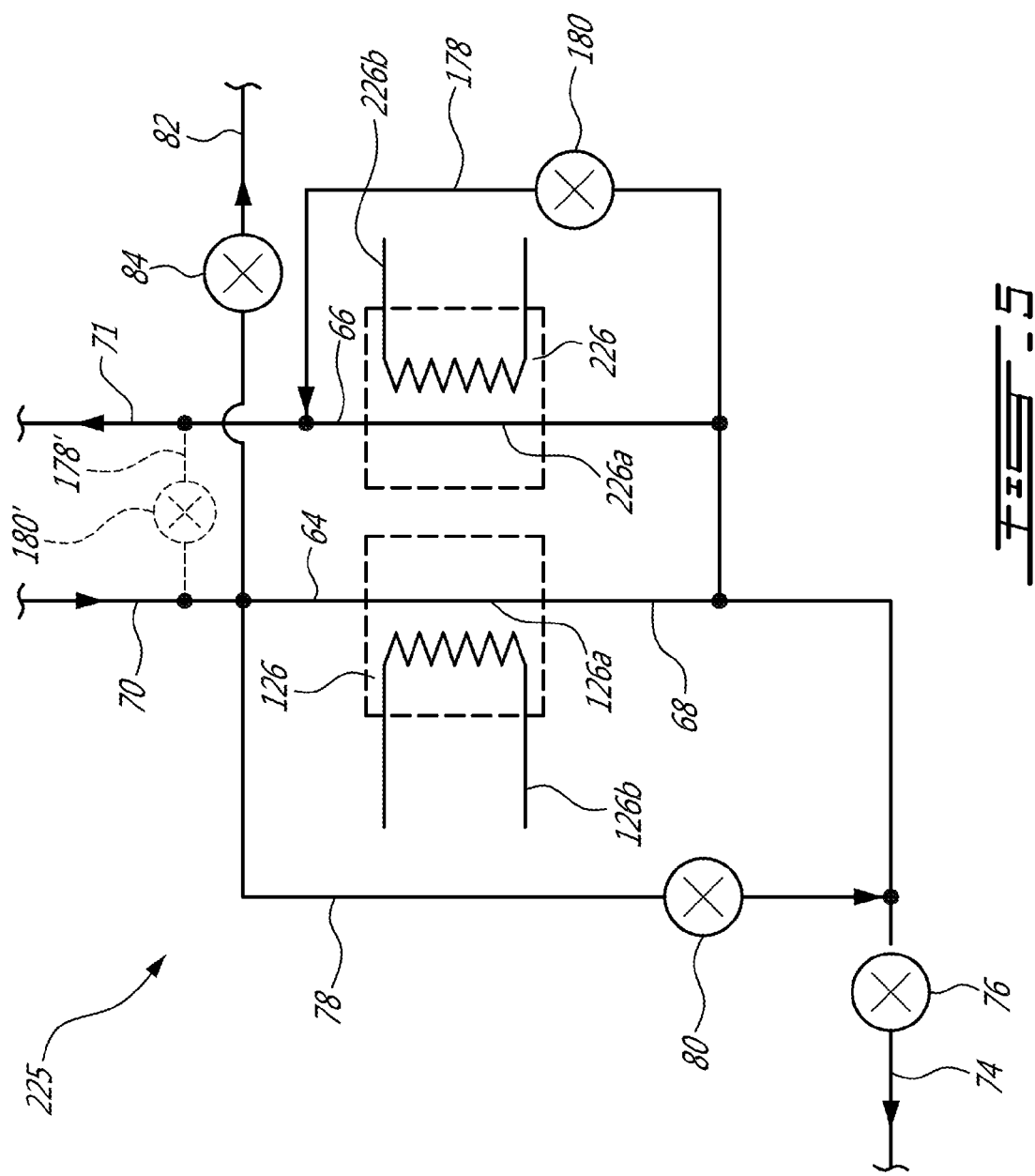

Referring to FIG. 5, another particular embodiment of the flow diverting assembly 225 is shown. The outlet conduit 70 is connected to the bypass conduit 78, the intercooler inlet conduit 64, and the excess air duct 82 (through the diverter valve 84). A first intercooler 126 used as a pre-cooler has first conduit(s) 126*a* each having an inlet in fluid communication with the intercooler inlet conduit 64, and an outlet in fluid communication with an intercooler intermediate conduit 68.

The intercooler intermediate conduit 68 is in fluid communication with the bleed conduit 74 through the bleed air valve 76, and the bypass conduit 78 provides fluid communication between the outlet conduit 70 and a portion of the bleed conduit 74 upstream of the bleed air valve 76 in parallel of the intercooler 126. Accordingly, the temperature of the compressed air circulated to the bleed conduit 74 may be regulated by changing the proportion of the flow going through the intercooler 126 by controlling the proportion of the flow going through the bypass conduit 78 with the bypass valve 80.

The flow diverting assembly 225 includes a second intercooler 226 also having first conduit(s) 226*a* in heat exchange relationship with second conduit(s) 226*b*. Each first conduit 226*a* of the intercooler 226 has an inlet in fluid communication with the intercooler intermediate conduit 68, and an outlet in fluid communication with the intercooler outlet conduit 66. Each second conduit 226*b* of the intercooler 226 is configured for circulation of a coolant therethrough, for example cooling air.

The intercooler outlet conduit 66 is in fluid communication with the inlet conduit 71 (and accordingly with the engine core inlet 12*i*); the second intercooler 226 thus further reduces the temperature of the compressed air going to the engine core 12. An additional bypass conduit 178 provides fluid communication between the intercooler intermediate conduit 68 and the inlet conduit 71 in parallel of the intercooler 226, thus allowing for a selected part of the flow to bypass the intercooler 226 before reaching the inlet conduit 71 (and accordingly the engine core inlet 12*i*). The additional bypass conduit 178 includes an additional bypass valve 180 to regulate the flow circulating therethrough. The temperature of the compressed air circulated to the inlet conduit 71 may be regulated by changing the proportion of the flow going through the intercoolers 126, 226 by controlling the proportion of the flow going through the bypass conduits 78, 178 with the bypass valves 80, 180.

An alternate embodiment is shown in dotted lines, where the bypass conduit 178 is replaced by a bypass conduit 178' containing bypass valve 180' and extending between the outlet conduit 70 and inlet conduit 71.

The inlet conduit 71 thus communicates with the pre-cooler intercooler 126 at least in part through the second intercooler 226, while the bleed conduit 74 communicates with the pre-cooler intercooler 126 upstream of the second intercooler 226, thus independently thereof. The arrangement thus allows for separate regulation of the temperature of the flow reaching the bleed conduit 74 and of the flow reaching the inlet conduit 71. For example, the proportion of the flow circulating through the intercooler 126 may be selected such that the temperature of the flow reaching the bleed conduit 74 is 450° F. or lower, and the temperature of the flow is further reduced in the second intercooler 226 to have a value of 250° F. or lower when reaching the inlet conduit 71. Other values are also possible.

In all embodiments, the flow diverting assembly 25, 125, 225 may include pressure, temperature and/or flow sensors, and/or closed loop system(s) controlling the position of one, some or all of the valves 76, 80, 84, 180, 180'. Any one, some or all of the valves 76, 80, 84, 180, 180' may be a hydraulically, pneumatically or electrically driven modulating valve.

In a particular embodiment, the engine assembly 10 is air startable from the pneumatic system of the aircraft or the engine bleed, as opposed to electrical power. Opening the bleed air valve 76 and the diverter valve 84 admits pressurized air to the second stage turbine 24, thereby providing a means to start rotation of the engine assembly 10. Such a configuration may thus allow for a rapid start in flight without the need to use electrical power. When provided, the third turbine (not shown) receiving air from the excess air duct 82 could also allow for air starting of the engine assembly 10. Check valves or bypass valves (not shown) may be needed to prevent reverse flow through other parts of the engine assembly 10. In both cases the compressor 18 is dead headed on the bleed side, so the engine start at low speed, and the external start flow is cancelled as soon as possible before accelerating to full speed to prevent high energy compressor stalls.

In an alternate embodiment, the diverter valve 84 is omitted or may be simplified to a two position on/off valve. The flow from the compressor 18 is ducted to the engine core 12 and to the excess air duct 82, and the compressed air is "bled" from the excess air duct 82 as required by the aircraft, limited if necessary by the load control valve 76. Such a configuration may allow loss reduction by eliminating the regulating or diverter valve pressure drop between the compressor 18 and the downstream heat exchanger 28 and turbine. When a two position diverter valve 84 is employed the valve is closed when the aircraft has a high pneumatic demand on the engine assembly 10 and fully open when the engine assembly 10 is operated with low pneumatic demand or for electrical power only.

In an alternate embodiment, the intercoolers 26, 126, 226 are omitted and the flow is circulated to the inlet conduit 71 and bleed conduit 74 without being cooled.

Figure 6:
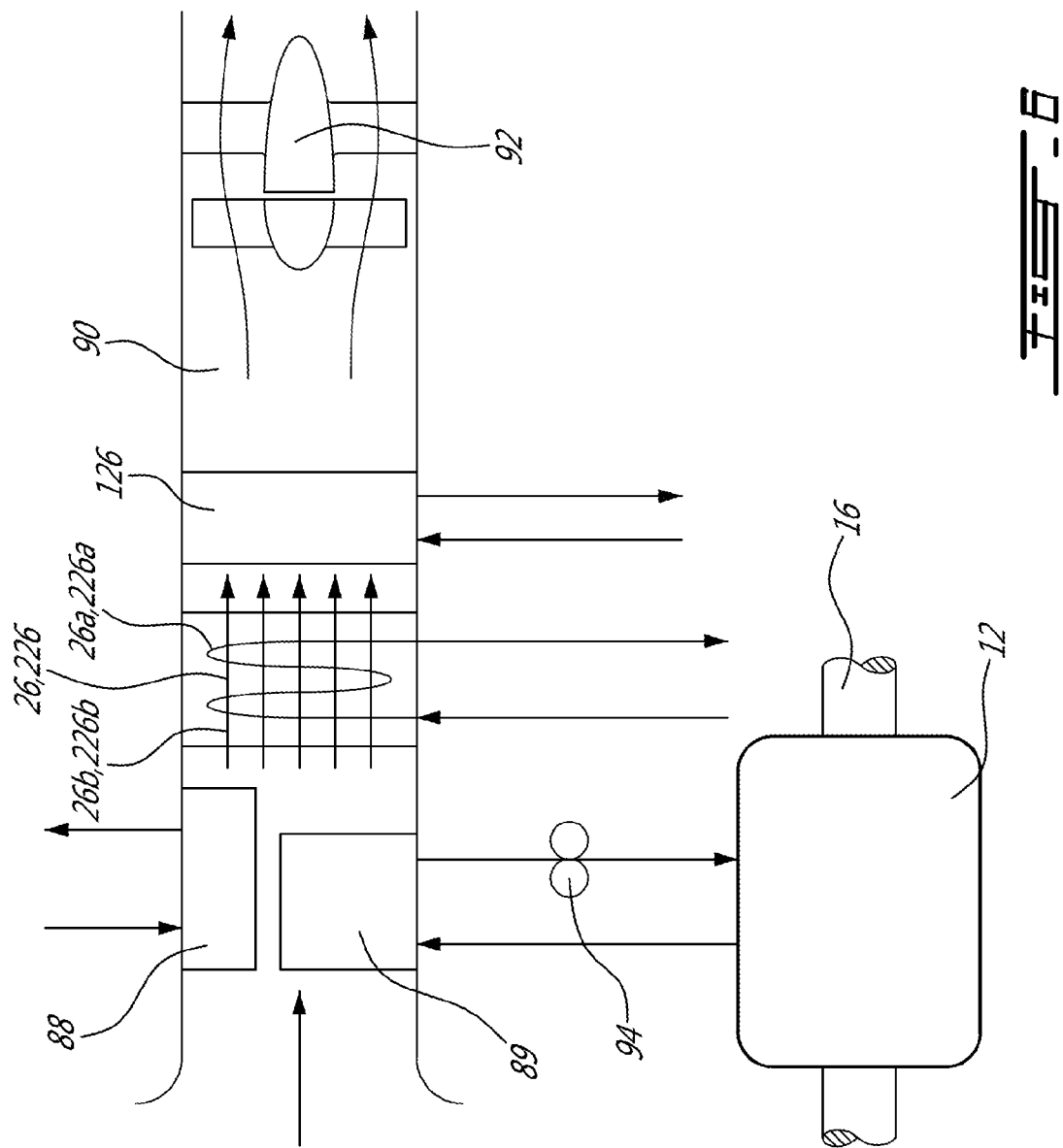
FIGS. 6-7 are schematic views of cooling assemblies which can be used in a compound engine assembly such as shown in FIG. 1, in accordance with particular embodiments.

Referring to FIG. 6, in a particular embodiment, the engine assembly 10 includes an oil cooler 88 to remove heat from the oil system of the engine assembly 10, and an engine core liquid cooler 89 to remove heat from the coolant (e.g. water, oil or other liquid coolant) of the cooling system of the engine core 12. A coolant pump 94 circulates the coolant between the engine core 12 and the engine core liquid cooler 89. The coolers 88, 89 are integrated with the intercooler 26/226 (and pre-cooler intercooler 126 if provided) in a cooling assembly to prevent replication of items like cooling fans and eductors. In this particular embodiment, the coolers 88, 89 and intercoolers 26/226, 126 are arranged in series in a single air duct 90 which is vented by a cooling fan 92 in ground operations or part of a ram air circuit in flight. The cooling fan 92 may be driven by any suitable rotating element of the engine assembly 10, or powered by the generator 14. A single inlet and exhaust can thus be used for providing coolant to all the coolers 88, 89, and intercoolers 26/226, 126. The coolers 88, 89 and intercooler 26/226, 126 are placed within the duct according to their temperature requirements. In the embodiment shown, the oil cooler 88 and engine core liquid cooler 89 have the lowest temperature requirements (e.g. requiring to cool the fluids therein at around 180° F. to 200° F.), and the cooling air temperature at the inlet of the air duct 90 is 130° F. or lower; the intercooler 26/226 has a higher temperature requirement than the coolers 88, 89 (e.g. around 250° F.), and the pre-cooler intercooler 126 (if provided) has a higher temperature requirement than the intercooler 26/226 (e.g. around 450° F.). Other values are also possible.

Figure 7:
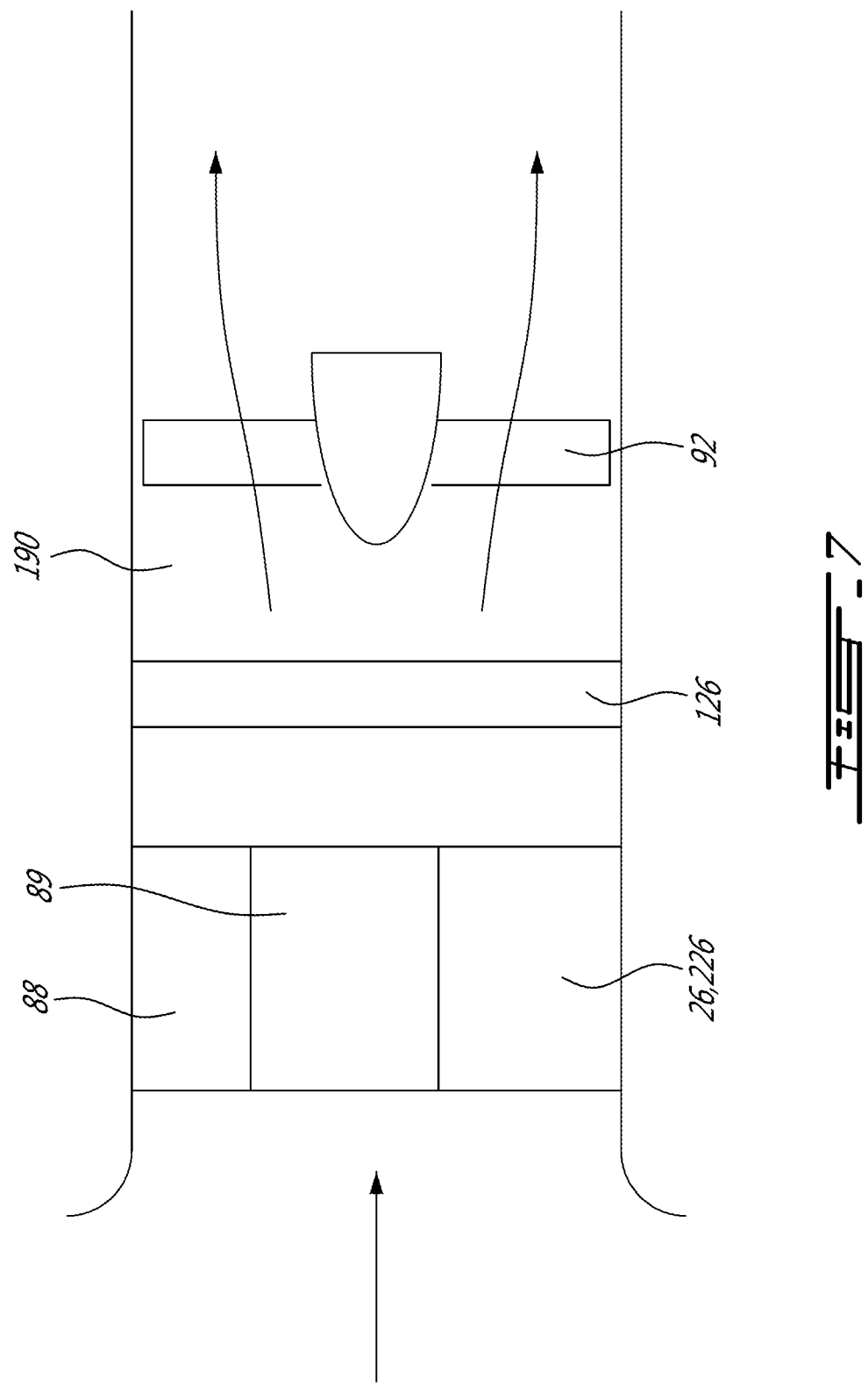

Referring to FIG. 7, another embodiment for the cooling assembly is shown. In this embodiment, the coolers 88, 89 and the intercooler 26/226 are in parallel in the air duct 190 vented by the cooling fan 92, with the pre-cooler intercooler 126 being provided downstream of the others. In another embodiment which is not shown, the coolers 88, 89 and intercoolers 26/226, 126 are all placed in parallel in the air duct.

Figure 8:
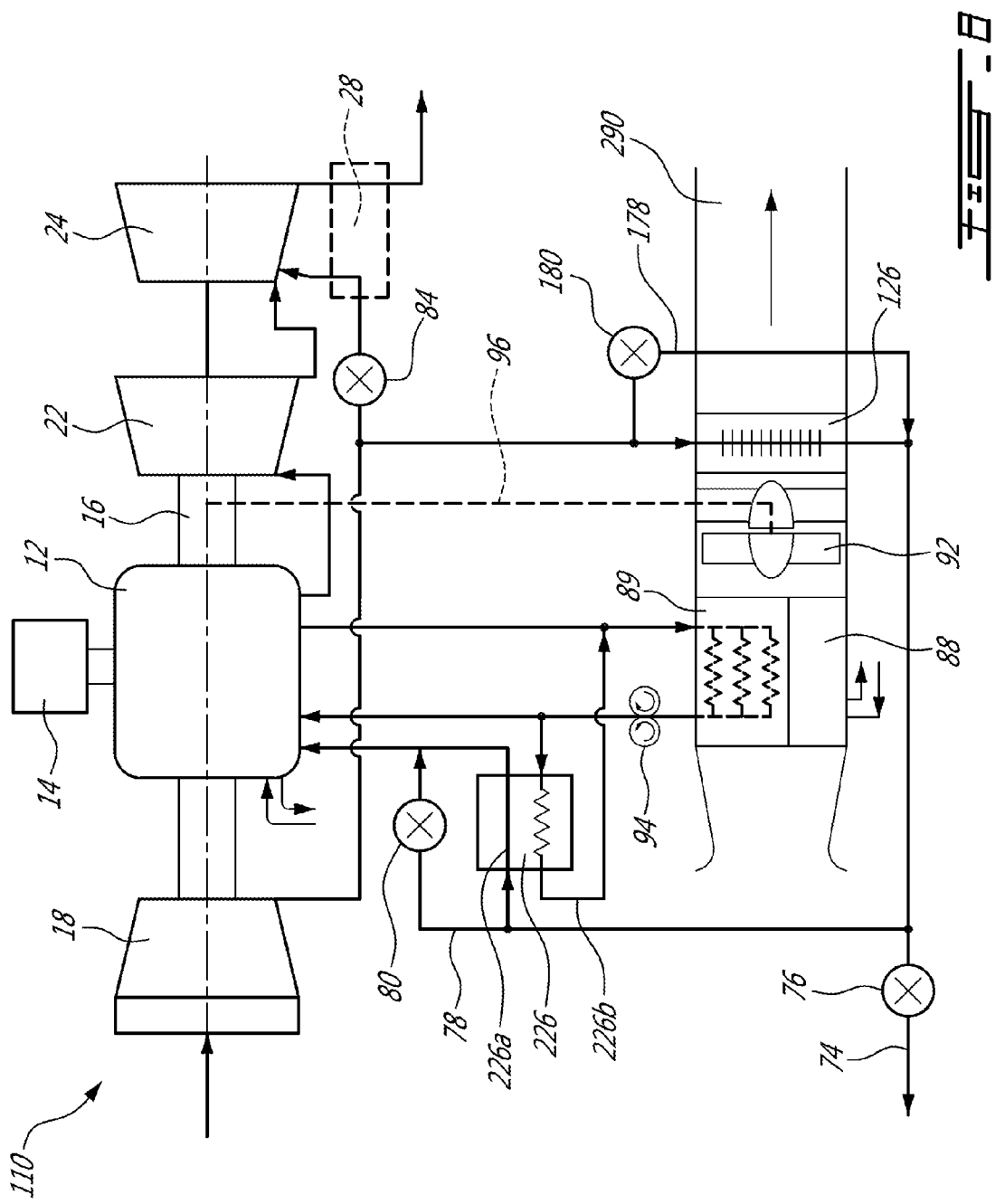
FIG. 8 is a schematic view of a compound engine assembly in accordance with a particular embodiment.

Referring to FIG. 8, a compound engine assembly 110 with cooling assembly in accordance with a particular embodiment is shown. In this embodiment, the second conduit(s) 226b of the intercooler 226 are in fluid communication with the liquid cooling system of the engine core 20 such that the coolant from the liquid cooling system is circulated in the second conduit(s) 226b to cool the compressed air circulated in the first conduit(s) 226a. In this embodiment, a mechanical drive 96 is provided between the cooling fan 92 and the shaft 16 of the engine core 12. The coolers 88, 89 are placed in parallel in the cooling air duct 290 upstream of the fan 92, and the pre-cooler intercooler 126 is placed in the duct 290 downstream of the fan 92. In a particular embodiment, such an arrangement provides for an optimal cooling delta T to the oil, engine coolant and compressed air while preserving acceptable entry temperatures to the fan 92 to keep its power below a desirable threshold and avoid the need for more expensive materials which may be required if the fan 92 was located in a hotter zone downstream of the intercooler 126.

Figure 9:
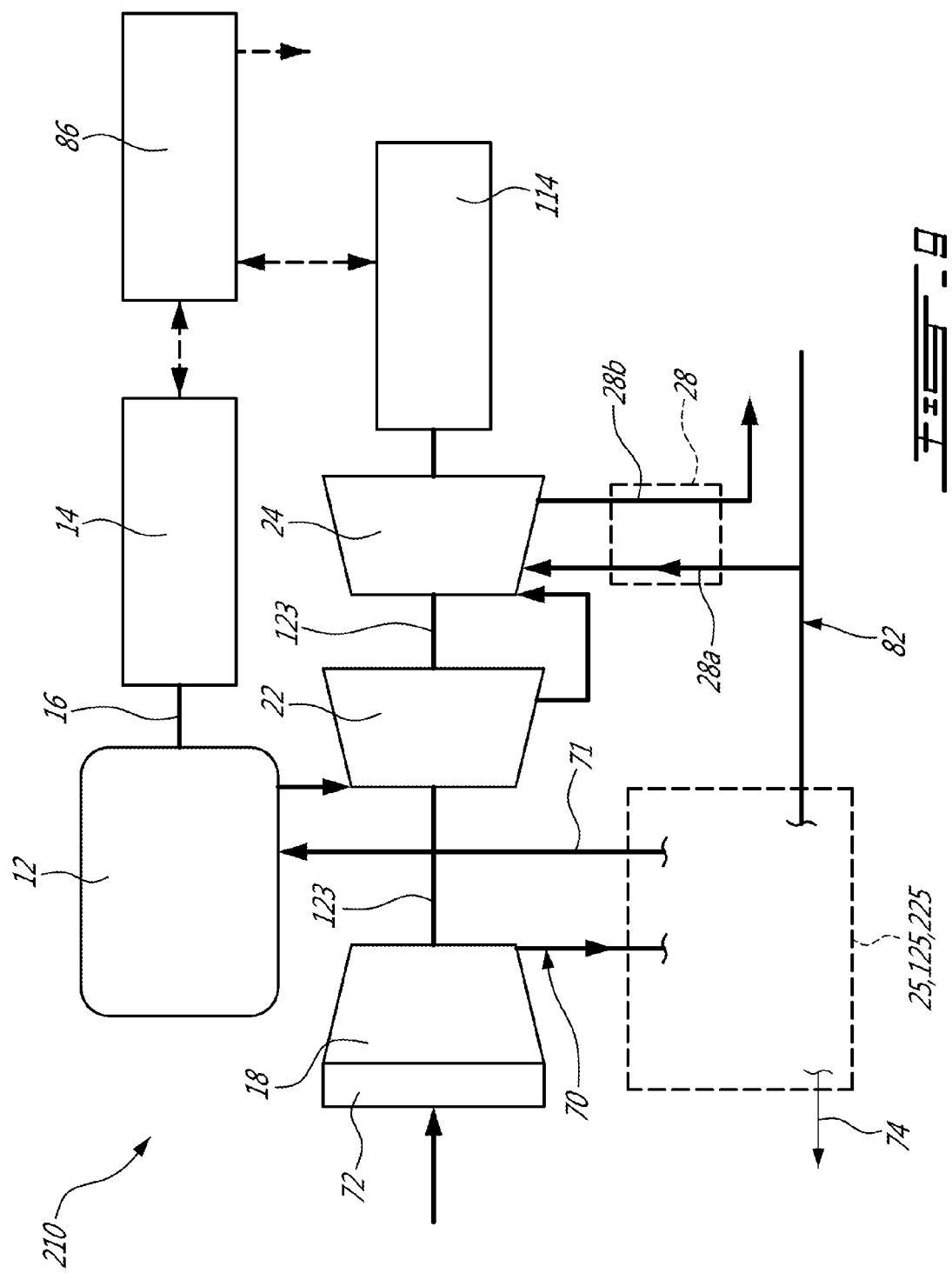
FIG. 9 is a schematic view of a compound engine assembly in accordance with another particular embodiment, which may be used with the flow distribution assemblies of FIGS. 3-5 and/or the cooling assemblies of FIGS. 6-7.

Referring to FIG. 9, a compound engine assembly 210 according to another embodiment is shown, where components similar to that of the embodiment shown in FIG. 1 are identified by the same reference numerals and are not further described herein. As described above, the engine core 12 includes one or more internal combustion engine(s) including, but not limited to, any type of rotary engine (e.g. Wankel engine), and any type of non-rotary internal combustion engine such as a reciprocating engine. Any one of the flow distribution assemblies 25, 125, 225 or any other appropriate flow distribution assembly may be used to distribute the flow from the outlet conduit 70 to the inlet conduit 71, bleed conduit 74 and excess air duct 84.

In this embodiment, the shaft 16 of the engine core 12 is only mechanically coupled to the generator 14, and not to the rotors of the compressor 18 and turbines 22, 24. The first and second stage turbines 22, 24 are mechanically coupled to the compressor 18, for example by having their rotors supported by a same turbine shaft 123. The first and second stage turbines 22, 24 are also mechanically coupled to a second generator/electrical motor 114. In a particular embodiment, the shaft 16 of the engine core 12 and the turbine shaft 123 are each coupled to their respective generator 14, 114 through a direct connection; the generator 14 coupled to the engine core 12 may thus have a lower speed of rotation than the generator 114 coupled to the turbine shaft 123. Alternately, one or both connection(s) may be performed through a respective gearbox (not shown).

In another particular embodiment, the generator 114 directly driven by the turbines 22, 24 (or by one of the turbines in an embodiment where the turbines are on different shafts) has a nominal frequency of at least 400 Hz suitable for high power density aircraft electrical equipment, for example a 2 poles, alternative current generator with a nominal frequency of 400 Hz having a design speed of from 22800 to 25300 rpm, which may correspond to a nominal speed of 24000 rpm. Such a generator 114 may be used in combination with any of the particular generators 14 mentioned above.

Power from the two shafts 16, 123 is compounded through electrical power being transferred between the two generators 14, 114. For example, the first generator 14 transfers power to the second generator/motor 114 which acts as a motor to drive the rotor(s) of the compressor 18. The generators 14, 114 also provide electrical power for the aircraft.

In the embodiment shown, a power controller 86 is provided to control power transfer between the two generators 14, 114 and power provided to the aircraft. In a particular embodiment, the power controller 86 allows for the compressor and engine core speed ratio to be variable, with each rotational speed being scheduled independently for optimal performance. The portion of the power from the first generator 14 being transferred to the second generator/motor 114 can be controlled to achieve the most advantageous rotational speed for the rotor(s) of the compressor 18. In addition, when the turbines 22, 24 coupled to the compressor 18 generate excess energy, the second generator/motor 114 can also provide power to the aircraft and/or to the first generator 14 which may also act as a motor. The power controller 86 may also contain features such as frequency and voltage regulation to manage AC power quality supplied to the airframe.

Although not shown, the transfer of power from the engine core 12 to the supercharger (compressor 18 and turbines 22, 24) may also be performed through hydraulic or mechanical CVT systems to allow for independent speed scheduling.

Figure 10:
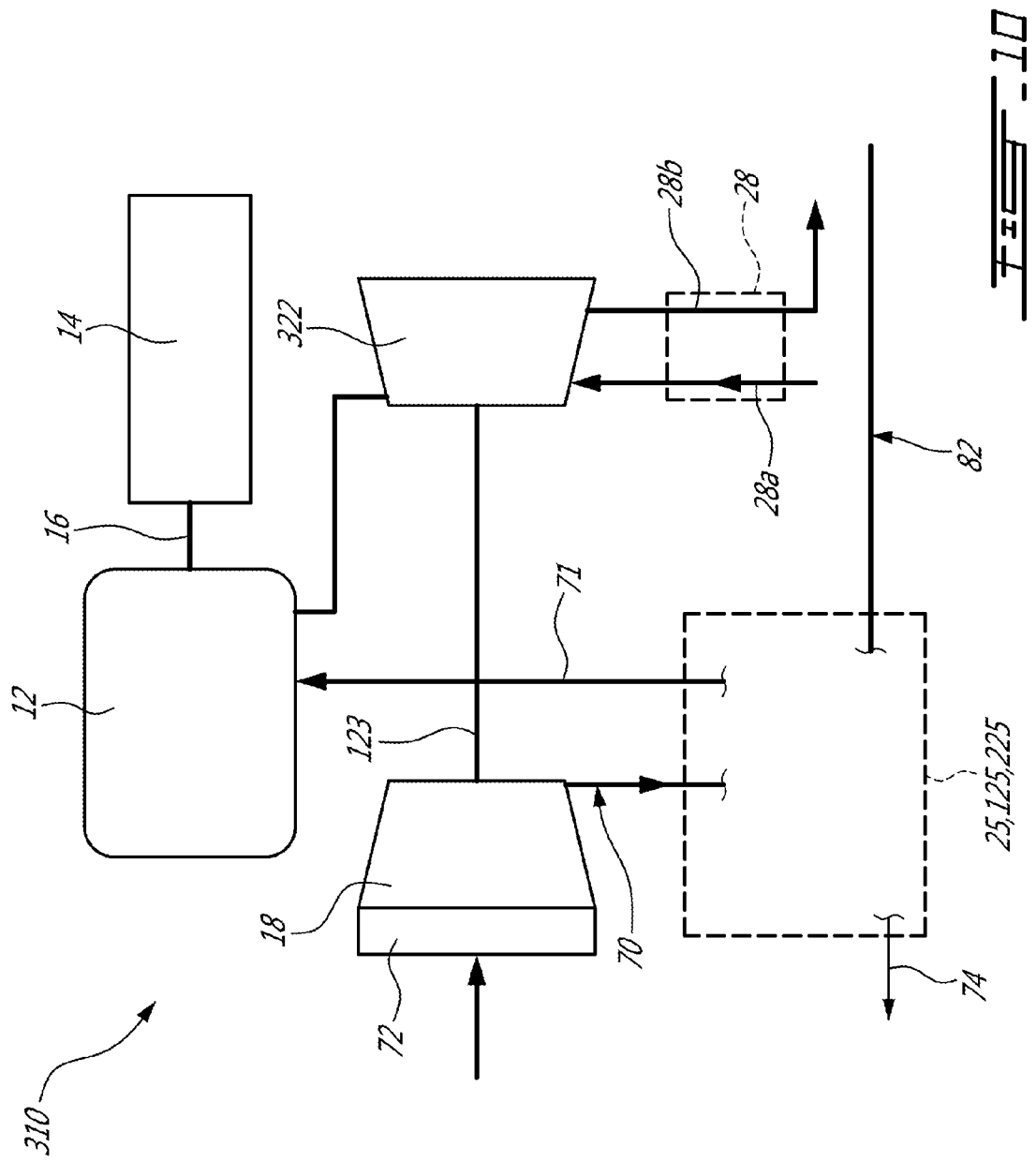
FIG. 10 is a schematic view of an engine assembly in accordance with another particular embodiment, which may be used with the flow distribution assemblies of FIGS. 3-5 and/or the cooling assemblies of FIGS. 6-7.

Referring to FIG. 10, an engine assembly 310 according to another embodiment is shown, where components similar to that of the embodiment shown in FIG. 1 are identified by the same reference numerals and are not further described herein.

In this embodiment, the shaft 16 of the engine core 12 is mechanically coupled to the generator 14, and the power of the turbine(s) is not compounded with that of the engine core 12. Although a single turbine 322 is shown, multiple turbines may be provided. The turbine 322 is mechanically coupled to the compressor 18, for example by having their rotors supported by a same shaft 123. The turbine 322 may be configured as an impulse turbine or as a pressure turbine, and may have any suitable reaction ratio, including, but not limited to, the ratios described above for turbines 22, 24. In a particular embodiment, the turbine 322 is replaced by first and second stages turbines 22, 24 as previously described.

Any one of the flow distribution assemblies 25, 125, 225 or any other appropriate flow distribution assembly may be used to distribute the flow from the outlet conduit 70 to the inlet conduit 71, bleed conduit 74 and excess air duct 84. When more than one turbine is provided, the flow from the excess air duct 84 may be circulated to the inlet of any one of the turbines.

Although not shown, the turbine(s) 322 may also drive a separate generator or any other appropriate type of accessory. Although not shown, a power controller may be provided to control power transfer between the generator 14 and any system receiving electrical power from the generator 14.

Figure 11:
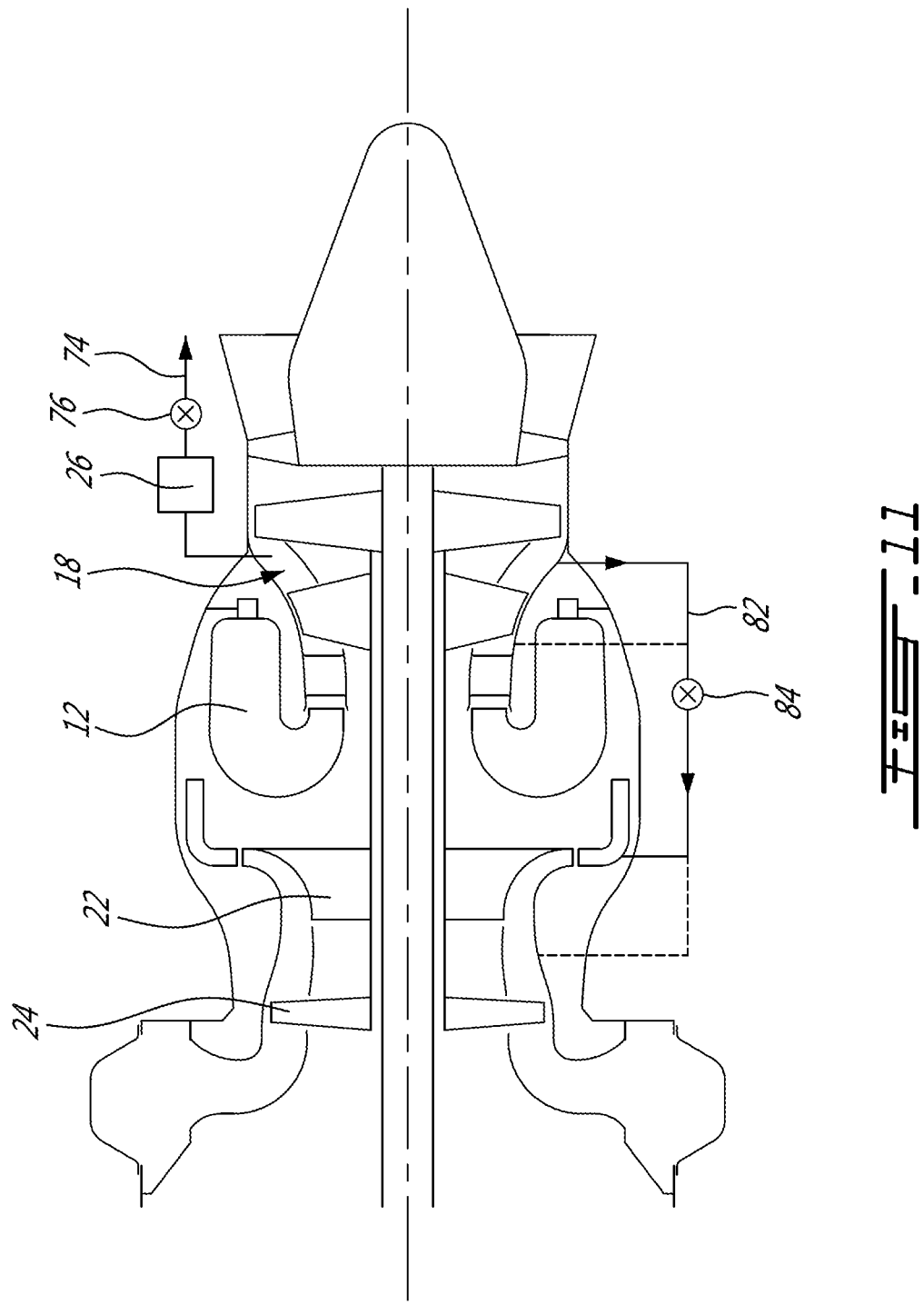
FIG. 11 is a schematic view of a gas turbine engine in accordance with a particular embodiment.

The above description is meant to be exemplary only, and one skilled in the art will recognize that changes may be made to the embodiments described without departing from the scope of the invention disclosed. For example, although the compressor 18 has been shown as providing compressed air both for the engine core 12 and for the aircraft, alternately the compressor 18 may be configured to act only as a supercharger for the engine core 12, and a separate load compressor may be configured to provide the aircraft air. Such a load compressor may be driven by the engine core 12 and/or the turbines 22, 24, 322 either directly or through a gearbox. The two compressors may have a common inlet. Moreover, although the engine core 12 has been described as including one or more internal combustion engines, the engine core 12 may alternately be any other type of engine core in which the compressed air is mixed with fuel and ignited for generating hot combustion gases, including, but not limited to, a gas turbine engine combustor; as non-limiting examples, the intercooler 26, 126 cooling compressed air circulated to the aircraft, and the circulation of the excess air from the compressor 18 to a turbine 22, 24 with the excess air duct 82 to provide additional work with or without an exhaust heat exchanger 28 between the excess air and the turbine exhaust, may be applied to a gas turbine engine with a combustor, as schematically illustrated in FIG. 11. Other modifications which fall within the scope of the present invention will be apparent to those skilled in the art, in light of a review of this disclosure, and such modifications are intended to fall within the appended claims.

The invention claimed is:

1. An engine assembly for use as an auxiliary power unit for an aircraft, the engine assembly comprising:
   at least one internal combustion engine in driving engagement with an engine shaft;
   a generator having a generator shaft in driving engagement with the engine shaft to provide electrical power for the aircraft, the generator and engine shafts being directly engaged to one another such as to be rotatable at a same speed;
   a compressor having an outlet in fluid communication with an inlet of the at least one internal combustion engine; and
   a turbine having an inlet in fluid communication with an outlet of the at least one internal combustion engine.

2. The engine assembly as defined in claim 1, wherein the turbine is mechanically coupled to the compressor.

3. The engine assembly as defined in claim 1, further comprising a bleed conduit having an end configured for connection with a pneumatic system of the aircraft, the bleed conduit in fluid communication with the outlet of the compressor through a bleed air valve selectively opening and closing the fluid communication between the outlet of the compressor and the end of the bleed conduit configured for connection to the pneumatic system.

4. The engine assembly as defined in claim 1, wherein each of the at least one internal combustion engine includes a rotor sealingly and rotationally received within a respective internal cavity to provide rotating chambers of variable volume in the respective internal cavity, the rotor having three apex portions separating the rotating chambers and mounted for eccentric revolutions within the respective internal cavity, the respective internal cavity having an epitrochoid shape with two lobes.

5. The engine assembly as defined in claim 4, wherein the generator has a nominal frequency of 400 Hz.

6. The engine assembly as defined in claim 5, wherein the generator has a nominal rotational speed of at least 5700 rotations per minute.

7. The engine assembly as defined in claim 5, wherein the generator is selected from the group consisting of: a 6 pole, 3 phases, alternative current generator having a design speed of from 7600 to 8400 rotations per minute; a 8 pole, 3 phases, alternative current generator having a design speed of from 5700 to 6300 rotations per minute; and a 4 pole, 3 phases, alternative current generator having a design speed of from 11400 to 12600 rotations per minute.

8. The engine assembly as defined in claim 1, wherein the generator is a first generator, the turbine includes at least one rotor engaged on a turbine shaft rotatable independently of the engine shaft, the assembly further comprising a second generator having a second generator shaft directly engaged to the turbine shaft such that the turbine and second generator shafts are rotatable at a same speed.

9. The engine assembly as defined in claim 1, wherein the turbine is a first stage turbine, the assembly further comprising a second stage turbine having an inlet in fluid communication with an outlet of the first stage turbine.

10. The engine assembly as defined in claim 9, wherein the first stage turbine is configured as an impulse turbine with a pressure-based reaction ratio having a value of at most 0.25, the second stage turbine having a higher reaction ratio than that of the first stage turbine.

11. The engine assembly as defined in claim 1, further comprising variable inlet guide vanes, a variable diffuser or a combination thereof at an inlet of the compressor.

12. An engine assembly for use as an auxiliary power unit for an aircraft, the engine assembly comprising:
    at least one internal combustion engine in driving engagement with an engine shaft;
    a generator having a generator shaft in driving engagement with the engine shaft to provide electrical power for the aircraft, the generator and engine shafts being directly engaged to one another such as to be rotatable at a same speed;
    a compressor having an outlet in fluid communication with an inlet of the at least one internal combustion engine;
    a first stage turbine having an inlet in fluid communication with an outlet of the at least one internal combustion engine; and
    a second stage turbine having an inlet in fluid communication with an outlet of the first stage turbine;
    wherein at least one of the turbines is in driving engagement with the compressor.

13. The engine assembly as defined in claim 12, further comprising a bleed conduit having an end configured for connection to a system of the aircraft, the bleed conduit being in fluid communication with the outlet of the compressor, and a bleed air valve selectively opening and closing the fluid communication between the end of the bleed conduit and the outlet of the compressor.

14. The engine assembly as defined in claim 12, wherein each of the at least one internal combustion engine includes a rotor sealingly and rotationally received within a respective internal cavity to provide rotating chambers of variable volume in the respective internal cavity, the rotor having three apex portions separating the rotating chambers and mounted for eccentric revolutions within the respective internal cavity, the respective internal cavity having an epitrochoid shape with two lobes.

15. The engine assembly as defined in claim 12, wherein the generator has a nominal frequency of 400 Hz.

16. The engine assembly as defined in claim 15, wherein the generator has a nominal rotational speed of at least 5700 rotations per minute.

17. The engine assembly as defined in claim 15, wherein the generator is selected from the group consisting of: a 6 pole, 3 phases, alternative current generator having a design speed of from 7600 to 8400 rotations per minute; a 8 pole, 3 phases, alternative current generator having a design speed of from 5700 to 6300 rotations per minute; and a 4 pole, 3 phases, alternative current generator having a design speed of from 11400 to 12600 rotations per minute.

18. The engine assembly as defined in claim 12, wherein rotors of the first and second stage turbines and of the compressor are engaged on a turbine shaft rotatable independently of the engine shaft, the generator is a first generator, the assembly further comprising a second generator having a second generator shaft directly engaged to the turbine shaft such that the turbine and second generator shafts are rotatable at a same speed.

19. The engine assembly as defined in claim 12, wherein the first stage turbine is configured as an impulse turbine with a pressure-based reaction ratio having a value of at most 0.25, the second stage turbine having a reaction ratio higher than that of the first stage turbine.

20. A method of providing electrical power to an aircraft, the method comprising:
    flowing compressed air from an outlet of a compressor to an inlet of at least one internal combustion engine of an engine assembly;
    rotating an engine shaft with the at least one internal combustion engine;
    driving a generator providing electrical power to the aircraft with the engine shaft through a direct drive engagement between a shaft of the generator and the engine shaft causing the shaft of the generator and the engine shaft to rotate at a same speed; and
    driving a turbine of the engine assembly with exhaust from the at least one internal combustion engine.

* * * * *